(12) United States Patent
Park

(10) Patent No.: US 8,788,162 B2
(45) Date of Patent: Jul. 22, 2014

(54) SHIFTING CONTROL FOR A HYBRID VEHICLE

(75) Inventor: Joonyoung Park, Seoul (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 198 days.

(21) Appl. No.: 13/240,081

(22) Filed: Sep. 22, 2011

(65) Prior Publication Data

US 2012/0143421 A1 Jun. 7, 2012

(30) Foreign Application Priority Data

Dec. 3, 2010 (KR) .................. 10-2010-0123053

(51) Int. Cl.
*B60W 50/02* (2012.01)

(52) U.S. Cl.
USPC ............. 701/54; 701/21; 701/25; 701/55; 701/57; 701/61; 477/34; 477/41; 477/70

(58) Field of Classification Search
None
See application file for complete search history.

(56) References Cited

U.S. PATENT DOCUMENTS

| | | | |
|---|---|---|---|
| 5,951,614 A * | 9/1999 | Tabata et al. .................. 701/54 |
| 6,317,665 B1 * | 11/2001 | Tabata et al. .................. 701/22 |
| 6,752,225 B2 * | 6/2004 | Kojima .................. 180/65.25 |
| 6,773,372 B2 * | 8/2004 | Matsubara et al. .............. 477/78 |
| 6,976,388 B2 * | 12/2005 | Heap et al. ................. 73/115.02 |
| 6,994,177 B2 * | 2/2006 | Ito et al. ...................... 180/65.21 |
| 7,010,406 B2 * | 3/2006 | Sah et al. ........................ 701/55 |
| 7,324,885 B2 * | 1/2008 | Sah et al. ........................ 701/58 |
| 7,597,165 B2 * | 10/2009 | Kaneko et al. ............... 180/65.6 |
| 8,177,680 B2 * | 5/2012 | Shibata et al. .................... 477/3 |
| 8,182,390 B2 * | 5/2012 | Sah et al. .......................... 477/3 |
| 8,260,510 B2 * | 9/2012 | Otsubo ........................... 701/51 |
| 8,280,599 B2 * | 10/2012 | Suzuki et al. ................... 701/54 |
| 2002/0016660 A1 * | 2/2002 | Suzuki et al. ................... 701/62 |
| 2005/0080535 A1 * | 4/2005 | Steinmetz et al. .............. 701/51 |
| 2007/0078580 A1 * | 4/2007 | Cawthorne et al. ............. 701/51 |
| 2007/0162210 A1 * | 7/2007 | Kitaori et al. ................... 701/51 |
| 2008/0293539 A1 * | 11/2008 | Matsubara et al. ............. 477/37 |
| 2008/0300744 A1 * | 12/2008 | Katsuta et al. .................. 701/22 |
| 2009/0029824 A1 * | 1/2009 | Tabata et al. ..................... 477/5 |
| 2009/0076693 A1 * | 3/2009 | Kumazaki et al. .............. 701/55 |
| 2009/0084618 A1 * | 4/2009 | Thompson et al. .......... 180/65.8 |
| 2009/0088291 A1 * | 4/2009 | Kumazaki et al. .............. 477/35 |
| 2009/0131216 A1 * | 5/2009 | Matsubara et al. ............. 477/37 |
| 2009/0171543 A1 * | 7/2009 | Sato et al. ........................ 701/55 |
| 2010/0256880 A1 * | 10/2010 | Sato ................................. 701/55 |
| 2011/0040432 A1 * | 2/2011 | Kaltenbach et al. ............ 701/22 |
| 2011/0218699 A1 * | 9/2011 | Petzold ........................... 701/22 |

FOREIGN PATENT DOCUMENTS

| | | |
|---|---|---|
| JP | 2001251704 A | 9/2001 |
| JP | 2005299844 A | 10/2005 |
| JP | 2008-074133 A | 4/2008 |
| JP | 2008149886 A | 7/2008 |

(Continued)

*Primary Examiner* — Thomas Tarcza
*Assistant Examiner* — Richard Goldman
(74) *Attorney, Agent, or Firm* — Edwards Wildman Palmer LLP; Peter F. Corless

(57) ABSTRACT

A system and method for shifting a hybrid vehicle is provided which utilizes one or more controllers to release one or more clutches and brakes when a transmission is shifted into neutral or park and then prevents a rotational element from being rotated by controlling an engine and a motor/generator when the transmission is in neutral or park. Accordingly, shift shock or slip is minimized when a transmission is shifted from a park or a neutral to a drive or a reverse, thus improving a shifting feeling and safety of the vehicle.

11 Claims, 10 Drawing Sheets

(56) References Cited

FOREIGN PATENT DOCUMENTS

| | | |
|---|---|---|
| JP | 2009073221 | 4/2009 |
| JP | 2009-160951 A | 7/2009 |
| JP | 2010018256 A | 1/2010 |
| JP | 2011098709 A | 5/2011 |
| KR | 10-2010-0088226 | 8/2010 |

* cited by examiner

SHIFTING CONTROL FOR A HYBRID VEHICLE

CROSS-REFERENCE TO RELATED APPLICATION

This application claims priority to and the benefit of Korean Patent Application No. 10-2010-0123053 filed in the Korean Intellectual Property Office on Dec. 3, 2010, the entire contents of which are incorporated herein by reference.

BACKGROUND OF THE INVENTION (a) Field of the Invention

The present invention relates to a gear shifting method of a hybrid vehicle that combines an engine and a motor to generate a rotation torque and to transfer the rotation torque to an output shaft through a transmission.

(b) Description of the Related Art

Generally, an automatic transmission uses a hydraulic pressure to shift gears in a multi step process so as to output appropriate torque from the rotation torque of an engine/motor according to a driving condition. Some hybrid vehicles use two motor/generators (MG) and one engine that are connected through a planetary gear and control the motor/generator to achieve a continuous variable shifting.

Typically, at least two motors and one planetary gear set are used in combination to create an electric continuously variable transmission (CVT) so that the speed of the engine can be freely controlled thereby. Clutches and/or brakes are often used between the planetary gear sets or the rotational elements thereof. By releasing and/or engaging the clutches and/or the brakes in the CVT transmission, rotational characteristics of the motors and the engine may be controlled. In a conventional CVT, the clutches and/or the brakes are released so as to prevent the torque from being transferred to the transmission output in a Neutral (N) mode or a Park (P) mode of the transmission.

When the transmission is transferred from a park or neutral condition to a drive (D) or reverse (R) position, slippage occurs in the clutch and the brake due to a rotational speed difference. As a result, vibration/noise is formed by the frictional force and the durability of the transmission is decreased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a shifting control for a hybrid vehicle which prevents slippage in a clutch or a brake when a transmission is shifted from park or a neutral to drive or reverse. Accordingly, the present invention reduces vibration/noise and improves durability.

A controller and method for shifting a hybrid vehicle according to an exemplary embodiment of the present invention may include releasing one or more clutches and brakes of a transmission into a neutral position, and preventing a rotational element from rotating when the one or more clutches and brakes of the transmission are in the neutral position by controlling an engine and motor/generator until the transmission is subsequently shifted into drive or reverse.

Furthermore, the present invention is also configured to control the speed of a motor/generator such that a rotation speed of a rotational element directly connected to an engine is equal to that of the engine when a transmission is subsequently shifted into drive or reverse.

More specifically the shifting control method of a hybrid vehicle may include an engine rotating a first carrier of a first planetary gear unit, a first motor/generator rotating a first ring gear of the first planetary gear unit, and a second motor/generator rotating a second sun gear of a second planetary gear unit. Additionally, the system may include one or more, e.g., a controllers, processors, etc., that is configured to release one more brakes and clutches <when?> transmission is shifted into park or neutral, determine whether a second brake for stopping a second ring gear of the second planetary gear unit is to be operated or a second clutch for direct connection to the first carrier with the second ring gear of the second planetary gear unit in drive or reverse is to be operated so as to prepare the transmission to be subsequently shifted into drive or reverse, and control the engine and the first motor/generator such that the second ring gear is not rotated, if it is determined that a ring gear is fixed by the second brake, wherein the first motor/generator is speed-controlled. Additionally, if it is determined that the engine is connected to the second ring gear by the second clutch, the engine, the first motor/generator, and the second motor/generator may be controlled such that a rotation speed of the second ring gear is equal to an output speed of the engine. If an output shaft of the transmission is larger than a predetermined value, the engine, the first motor/generator, and the second motor/generator may be controlled such that a rotation speed of the second ring gear is equal to an output speed of the engine. The speed of the first motor/generator may be feedback controlled to optimization.

Further, if an output speed of a transmission is less than a predetermined value, the engine, the first motor/generator, and the second motor/generator may be controlled such that the second ring gear is not rotated.

A shifting control method of a hybrid vehicle that includes a first planetary gear unit having a first sun gear, a first planetary gear, a first ring gear, and a first carrier; a second planetary gear unit having a second sun gear that rotate together with the first sun gear, a second planetary gear, a second ring gear, and a second carrier that transfers a toque to an output shaft; an engine that is disposed to rotate the first carrier of the first planetary gear unit; a first motor/generator that is disposed to rotate the first ring gear; a second motor/generator that is disposed to rotate the second sun gear; a first brake that is disposed to stop a rotation of the first motor/generator and the first ring gear; a first clutch that is disposed to connect the first carrier with the first ring gear such that they rotate together; a second clutch that is disposed to connect the first carrier with the second ring gear such that they rotate together; and a second brake that is disposed to selectively stop a rotation of the second ring gear. The present invention may include releasing the first/second brakes and the first/second clutches, if a transmission is shifted into park (P) or a neutral (N), determine whether the first brake is to be operated or the second clutch is to be operated so as to prepare a drive (D) or a rear (R) in a present park condition or a present neutral condition, and controlling the engine, the first motor/generator, and the second motor/generator such that the second ring gear is not rotated, if it is determined that the first brake is to be operated.

Again, if it is determined that the second clutch is to be operated, the engine, the first motor/generator, and the second motor/generator may be controlled such that an output speed of the engine is equal to a rotation speed of the second ring gear.

As described above, in a shifting control method of a hybrid vehicle according to an exemplary embodiment of the present invention, shift shock or slip is minimized when a transmission is shifted from a park or a neutral condition to a drive or a rear condition to improve a shifting feeling or safety.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

An exemplary embodiment of the present invention will hereinafter be described in detail with reference to the accompanying drawings.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
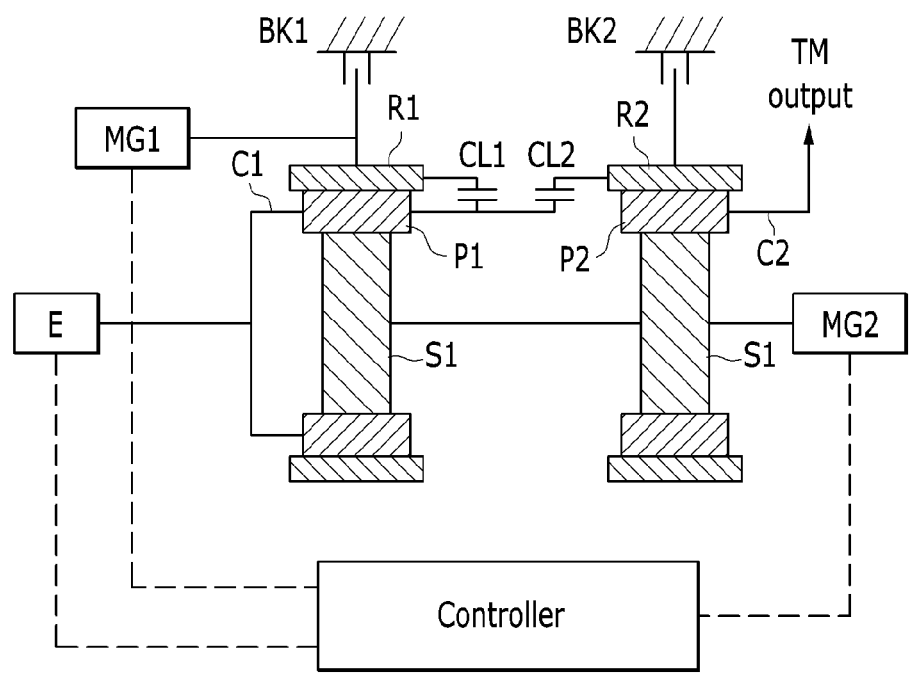
FIG. 1 is a schematic diagram of a shift system of a hybrid vehicle according to an exemplary embodiment of the present invention.

FIG. 1 is a schematic diagram of a shift system of a hybrid vehicle according to an exemplary embodiment of the present invention. Referring to FIG. 1, a gear shifting system of a hybrid vehicle includes an engine (E), a first planetary gear unit PG1, a second planetary gear unit PG2, a first motor/generator MG1, a second motor/generator MG2, a first clutch CL1, a second clutch CL2, a first brake BK1, a second brake BK2, and a transmission output shaft (TM output).

The first planetary gear unit PG1 includes a first sun gear S1 in a center thereof, a pair or plurality of first pinion gears P1 that are externally meshed with the first sun gear S1, and a first ring gear R1 that the first pinion gears P1 are internally meshed therewith, wherein the first carrier C1 connects the first pinion gears P1 to rotate axially around the first sun gear S1.

The second planetary gear unit includes a second sun gear S2 in a center of thereof, a pair or plurality of second pinion gears P2 that are externally meshed with the second sun gear S2, and a second ring gear R2 that the second pinion gears P2 are internally meshed therewith, wherein the second carrier C2 connects the second pinion gears P2 to rotate axially around the second sun gear S2.

An output shaft of the engine (E) is connected to the first carrier C1 and the engine (E) rotates the first carrier C1 axially around the first sun gear S1. Additionally, the first motor/generator MG1 is configured to rotate the first ring gear R1. Further, the first brake BK1 is configured to selectively brake (stop) the first ring gear R1. The first sun gear S1 and the second sun gear S2 are connected by one shaft to rotate together and the second motor/generator MG2 is configured to rotate the second sun gear S2.

The first clutch CL1 selectively connects the first carrier C1 with the first ring gear R1 such that they rotate or stop together and the second clutch CL2 selectively connects the first carrier C1 with the second ring gear R2 such that they rotate or stop together.

The second brake BK2 is fixed to selectively brake the second ring gear R2. Further, the second carrier C2 is connected to an output shaft (TM output) of a transmission to provide torque from the engine (E), the first motor/generator MG1, and the second motor/generator MG2 to one or more wheels in a vehicle's drive train system architecture.

Figure 2A:
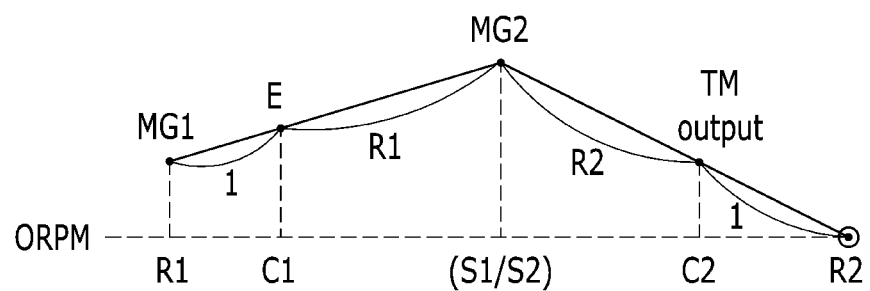
FIGS. 2A, B is a speed diagram showing an EVT1 mode and EVT2 mode in a gear shifting method of a hybrid vehicle according to an exemplary embodiment of the present invention.

FIGS. 2A, B is a speed diagram showing an Electronic Variable Transmission (EVT) EVT1 mode (FIG. 2A) and EVT2 mode (FIG. 2B) in a gear shifting method of a hybrid vehicle according to an exemplary embodiment of the present invention.

Referring to FIG. 2A, the transmission of the hybrid vehicle performs an EVT1 mode in a predetermined condition (e.g., drive or reverse). As shown, the first ring gear R1, the first carrier C1, the first and second sun gear S1 and S2, the second carrier C2, and the second ring gear R2 are disposed on a horizontal axis according to a predetermined gear ratio. The first motor/generator MG1, the engine (E), and the second motor/generator MG2 are disposed on a line to form a predetermined speed line and the second motor/generator MG2, the output shaft (TM output), and the second ring gear R2 are disposed on a line to form a predetermined speed line.

In the EVT1 mode, the first brake BK2 is operated, other brake (BK1) and clutches (CL1, CL2) are released, and the second the second ring gear R2 is fixed by the BK2. As can be seen from the FIG. 2A, the transmission output shaft (TM output) has a lower speed in this mode from the speed limitation of the MG2.

Figure 2B:
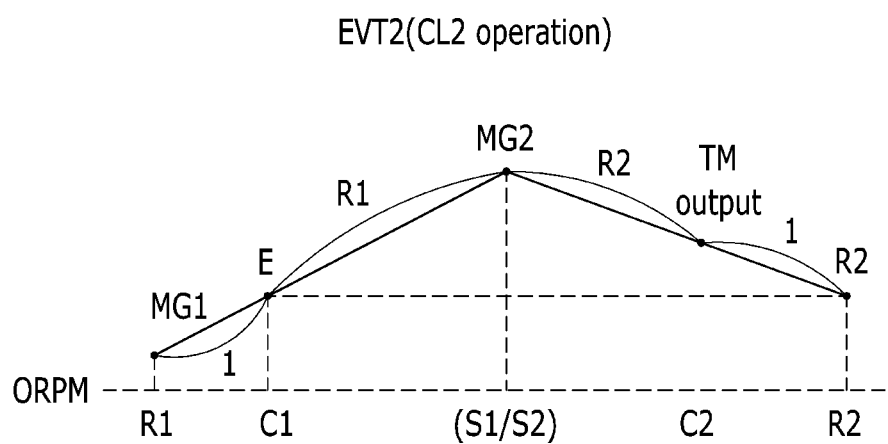

Referring to FIG. 2B, the transmission of the hybrid vehicle performs an EVT 2 mode in a predetermined condition (e.g., drive or reverse). As shown in FIG. 2B, the first ring gear R1, the first carrier C1, the first and second sun gear S1 and S2, the second carrier C2, and the second ring gear R2 are disposed on a horizontal axis according to a predetermined gear ratio. The first motor/generator MG1, the engine (E), and the second motor/generator MG2 are disposed on a line to form a predetermined speed line and the second motor/generator MG2, the output shaft (TM output), and the second ring gear R2 are disposed on a line to form a predetermined speed line.

The second clutch CL2 is operated and the other brakes (BK1, BK2) and clutch (CL1) are released in the EVT2 mode and a rotation speed of the engine (E) is controlled to be equal to that of the second ring gear R2 by operating the CL2.

However, the output shaft (TM output) has a predetermined high speed from the first motor/generator MG1, the engine (E), and the second motor/generator MG2. In the EVT2 mode, the TM output speed is determined by the max or the min speed of the MG1, MG2, and the engine, the TM output speed thereof can be faster than that of the EVT 1.

Figure 3:
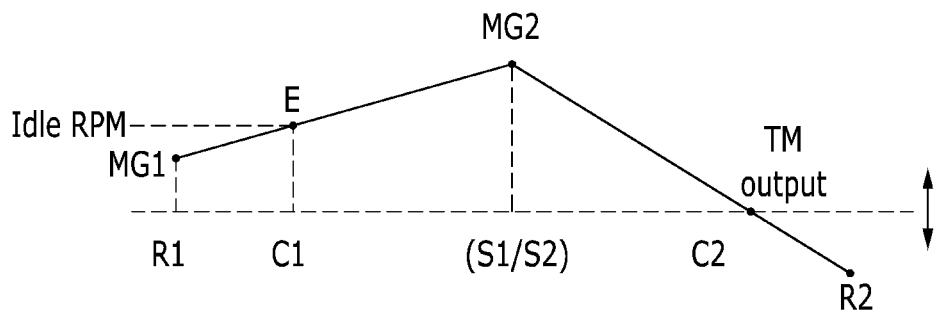
FIG. 3 is a speed diagram showing a park/neutral state in a gear shifting method of a hybrid vehicle according to an exemplary embodiment of the present invention.

FIG. 3 is a speed diagram showing a park/neutral state in a gear shifting method of a hybrid vehicle according to an exemplary embodiment of the present invention. Referring to FIG. 3, if the transmission is put in park or neutral, the transmission releases all clutches and brakes so as to perform park (P) or neutral (N) positioning. As shown in FIG. 3, the first ring gear R1, the first carrier C1, the first and second sun gear S1 and S2, the second carrier C2, and the second ring gear R2 are disposed on a horizontal axis according to a predetermined gear ratio. The first motor/generator MG1, the engine (E), and the second motor/generator MG2 forms a predetermined speed along one line and the second motor/generator MG2, the output shaft (TM output), and the second ring gear R2 forms a predetermined speed along another one line.

In a park/neutral mode, all clutches and brakes are released, the output shaft (TM output) rotates according to the speed of the vehicle, the engine (E) is controlled to output a predetermined torque, and the first and second motor/generator MG1 and MG2 are controlled to output a predetermined speed. Meanwhile, the speed of the second ring gear R2 and the speed of the engine are controlled so as to prepare the EVT1 mode and the EVT2 mode in a park/neutral condition according to an exemplary embodiment of the present invention. Hereinafter, this invention will be described in detailed with reference to FIG. 4, FIG. 5, FIG. 6 and FIG. 7.

Figure 4A:
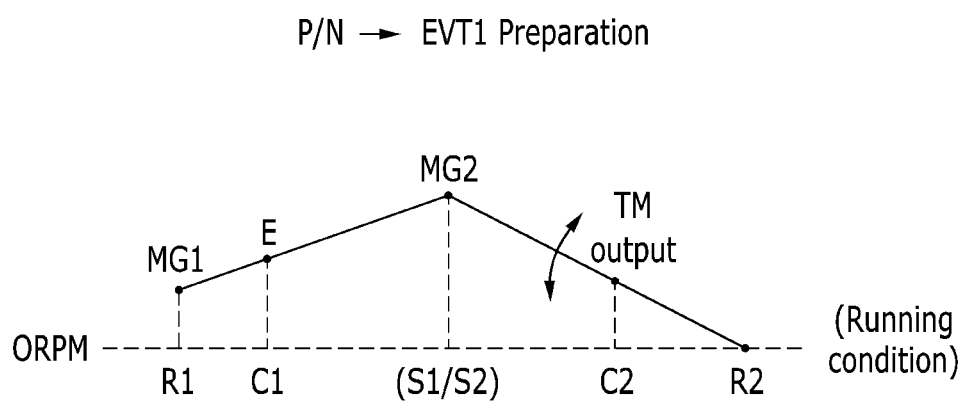
FIGS. 4A, B is a speed diagram showing a procedure preparing an EVT1 mode in a park/neutral position in a shifting control method of a hybrid vehicle according to an exemplary embodiment of the present invention.

FIGS. 4A, B is a speed diagram showing a procedure preparing an EVT1 mode in a park/neutral condition in a shifting control method of a hybrid vehicle according to an exemplary embodiment of the present invention. FIG. 4A has a predetermined speed of an output shaft (TM output), all clutches and brakes are released to sustain a park (P) or a neutral (N) position in a transmission, and the first motor/generator MG1 and the engine (E) are speed-controlled such that the rotational speed of the second ring gear R2 is controlled to become 0 when an output shaft (TM output) has a predetermined speed.

Accordingly, when the EVT1 mode is performed by shifting from a park or a neutral position to a drive (D) or a reverse (R) position, the second brake BK2 is operated with a certain degree of slippage.

Figure 4B:
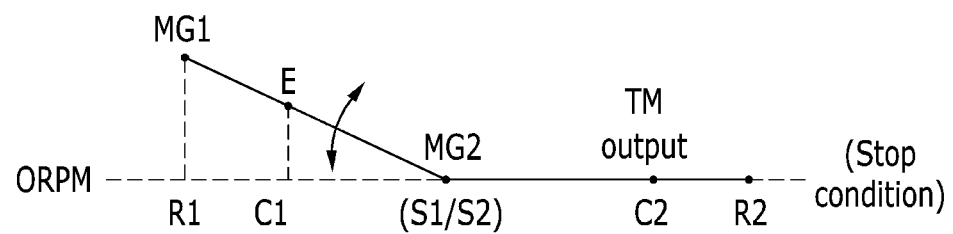

FIG. 4B has a speed of 0 for an output shaft (TM output), all clutches and brakes are released to sustain a park (P) or a neutral (N) of the transmission, and the first motor/generator MG1 and the engine (E) are speed-controlled such that the rotational speed of the second ring gear R2 is controlled to become 0 when an output shaft (TM output) has a predetermined speed.

Accordingly, when the EVT1 mode is performed by shifting from a park or a neutral condition to a drive (D) or a rear (R) condition, the second brake BK2 is operated with a certain degree of slippage.

Figure 5A:
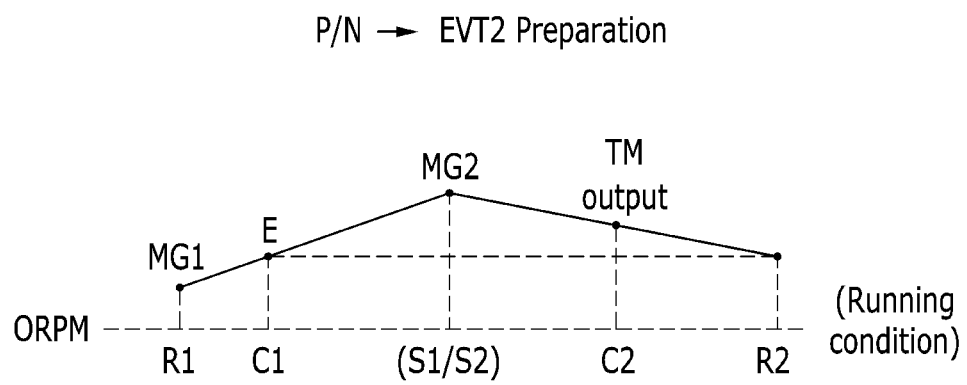
FIGS. 5A, B is a speed diagram showing a procedure preparing an EVT2 mode in a park/neutral position in a shifting control method of a hybrid vehicle according to an exemplary embodiment of the present invention.
Figure 5B:
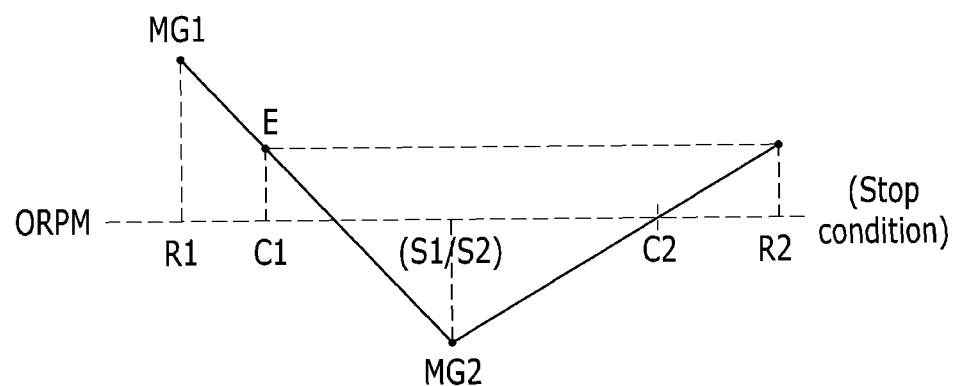

FIGS. 5A, B is a speed diagram showing a procedure preparing an EVT2 mode in a park/neutral condition in a shifting control method of a hybrid vehicle according to an exemplary embodiment of the present invention.

FIG. 5A has a predetermined speed of an output shaft (TM output), all clutches and brakes are released to sustain a park (P) or a neutral (N) position in a transmission, and the first motor/generator MG1 and the engine (E) are speed-controlled such that the rotational speed of the second ring gear R2 is controlled to be equal to the rotational speed of the engine (E) when an output shaft (TM output) has a predetermined speed.

Accordingly, when the EVT2 mode is performed by shifting from a park or a neutral condition to a drive (D) or a rear (R) condition, the second clutch CL2 is operated with a certain degree of slippage.

Figure 6:
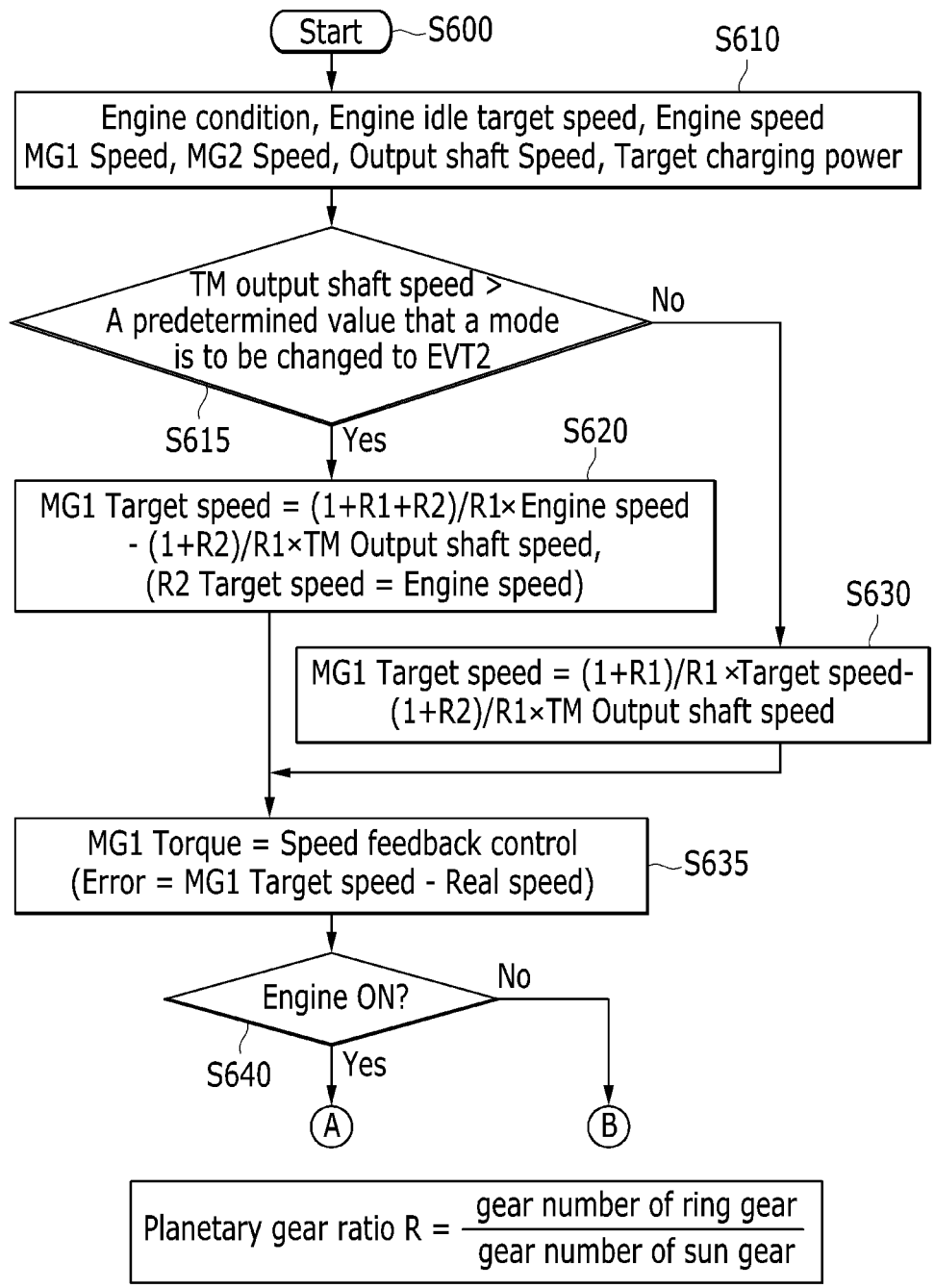
FIG. 6 and FIG. 7 are flowcharts showing procedures preparing an EVT1 mode and EVT2 mode in a park/neutral condition in a shifting control method of a hybrid vehicle according to an exemplary embodiment of the present invention.
Figure 7:
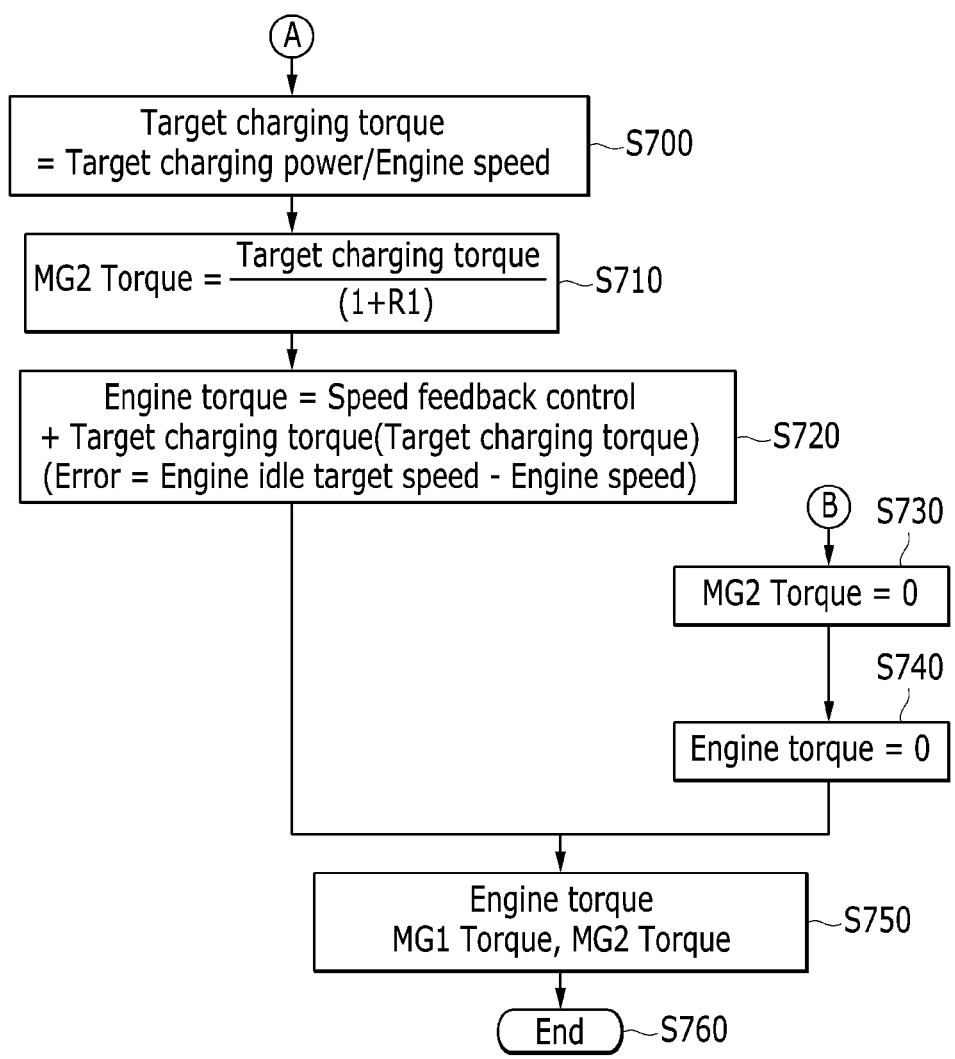

FIG. 6 and FIG. 7 are flowcharts showing procedures preparing an EVT1 mode and EVT2 mode in a park/neutral condition in a shifting control of a hybrid vehicle according to an exemplary embodiment of the present invention.

Referring to FIG. 6, control is started at S600, and an engine condition, an idle target speed of an engine, a present speed of an engine (E), a first motor/generator MG1 speed, a second motor/generator MG2 speed, a transmission output shaft (TM output) speed, and a target charging power are detected/calculated in S610.

In S610, it is determined whether an output shaft speed of the transmission (TM) is larger than a predetermined value of an EVT1 mode or EVT2 mode. If a speed of the output shaft (TM output) exceeds a predetermined value S620 is performed, and if a speed of the output shaft (TM output) is less than a predetermined value, S630 is performed.

In the S620, a target speed of the second ring gear is controlled to be equal to a rotational speed of the engine, and in the S630, a target speed of the second ring gear is controlled to become 0. In S620, a target speed of the first motor/generator MG1 is calculated to be (1+R1+R2)*R1*engine speed−1+R2/R1*transmission output shaft speed (TM output). In S630, a target speed of the first motor/generator MG1 is calculated to be 1+R1*R1*engine speed−1+R2/R1*transmission output shaft speed (TM output). Additionally, as described in S635, a speed of the first motor/generator G1 is feedback controlled.

In the above equations, R denotes a planetary gear ratio, wherein R=gear tooth number of a ring gear/gear tooth number of a sun gear. That is, R1=gear number tooth of a first ring gear/gear tooth number of a first sun gear, and R2=gear tooth number of a second ring gear/gear tooth number of a second sun gear.

In S640, the system, by e.g., a processor or a controller, determines whether the engine is being operated. If the engine is operated, the system/method continues to step A of FIG. 7, and if the engine is not operated, the system/method continues to step B of FIG. 7.

Referring to B of FIG. 7, an output torque of the second motor/generator MG2 is 0 and an output torque of the engine (E) is 0 in a condition that the engine (E) is not operated. In this case, only the first motor/generator MG1 is speed-controlled.

Referring to A of FIG. 7, a target charging torque is calculated in S700. The target charging torque is calculated by dividing a target charging power with an engine speed when the engine (E) is operated.

A torque of the second motor/generator MG2 is calculated by a target charging torque/(1+R1) in S710 to perform charging by speed control of the first motor/generator MG1 and the engine (E).

In S720, speed is feedback controlled according to the target charging torque, and torque according to a target charging torque is added to be outputted in this speed. In S750, the rotational speed and torque of the engine (E), the first motor/generator MG1, and the second motor/generator MG2 are respectively outputted, and control ends in S760.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

S1: first sun gear
P1: first pinion gear
R1: first ring gear
C1: first carrier
BK1: first brake
BK2: second brake
CL1: first clutch
CL2: second clutch
E: engine
MG1: first motor/generator
MG2: second motor/generator
S2: second sun gear
P2: second pinion gear
R2: second ring gear
C2: second carrier
TM output: (transmission) output shaft

What is claimed is:

1. A shifting control method of a hybrid vehicle, comprising:
   releasing one or more clutches and brakes of a transmission when the transmission is put in a neutral position; and
   controlling an engine and motor, by a controller, to prevent a rotational element of the transmission from rotating when the one or more clutches and one or more brakes of the transmission are in the neutral position until the transmission is subsequently shifted into drive or reverse by calculating a target speed of a first motor, wherein a first calculation is used by the controller to calculate the target speed of the motor when a transmission output shaft speed is greater than a predetermined value and a second calculation is used by the controller to calculate the target speed of the motor when a transmission output shaft speed is less than a predetermined value.

2. The shifting control method of a hybrid vehicle of claim 1, wherein the rotational element is a ring gear of a planetary gear unit.

3. A shifting control method of a hybrid vehicle, comprising:
   releasing clutches and brakes to place a transmission in a neutral state; and
   controlling a speed of a motor by calculating a target speed of a first motor, wherein a first calculation is used by the controller to calculate the target speed of the motor when a transmission output shaft speed is greater than a predetermined value and a second calculation is used by the controller to calculate the target speed of the motor when a transmission output shaft speed is less than a predetermined value,
   wherein based on the control the rotational speed of at least two rotational elements of the transmission, which are to be engaged with each other, are equalized when a transmission is subsequently shifted into drive or reverse.

4. The shifting control method of a hybrid vehicle of claim 3, wherein at least one of the two rotational elements is a ring gear of a planetary gear unit.

5. A system for shifting a hybrid vehicle, the system comprising:
   an engine operably connected a first carrier of a first planetary gear unit;
   a first motor operably connected to a first ring gear of the first planetary gear unit;
   a second motor operably connected to a second sun gear of a second planetary gear unit; and
   a controller configured to release one or more brakes and clutches when a transmission is shifted into park or neutral, determine whether a second brake for stopping a second ring gear of the second planetary gear unit is to be operated, and whether a first clutch for directly connecting the first carrier with the first ring gear of the first planetary gear unit is to be operated when the transmission is subsequently shifted into drive or reverse to prepare the transmission for shifting into drive or reverse, and prevent the second ring gear from moving by controlling the engine and the first motor, wherein the first motor is speed-controlled by calculating a target speed of a first motor, wherein a first calculation is used by the controller to calculate the target speed of the motor when a transmission output shaft speed is greater than a predetermined value and a second calculation is used by the controller to calculate the target speed of the motor when a transmission output shaft speed is less than a predetermined value.

6. The system of claim 5, wherein the controller is further configured to control the engine, the first motor, and the second motor so that a rotational speed of the second ring gear is equal to an output speed of the engine, if it is determined that the engine is connected to the second ring gear through the second clutch.

7. The system of claim 6, wherein the controller is further configured to control the engine, the first motor, and the second motor such that a rotation speed of the second ring gear is equal to an output speed of the engine, if an output speed of the transmission is larger than a predetermined value.

8. The system of claim 6, wherein a speed of the first motor is feedback controlled.

9. The system of claim 6, wherein the controller is further configured to control the engine, the first motor, and the second motor such that the second ring gear is not rotated, if an output speed of a transmission is less than a predetermined value.

10. A system for shifting a hybrid vehicle, the system comprising;
    a first planetary gear unit having a first sun gear, a first planetary gear, a first ring gear, and a first carrier;
    a second planetary gear unit having a second sun gear that rotate together with the first sun gear, a second planetary gear, a second ring gear, and a second carrier that transfers a toque to an output shaft;
    an engine that is disposed to rotate the first carrier of the first planetary gear unit;
    a first motor that is disposed to rotate the first ring gear;
    a second motor that is disposed to rotate the second sun gear;
    a first brake that is disposed to stop a rotation of the first motor and the first ring gear;
    a first clutch that is disposed to connect the first carrier with the first ring gear such that they rotate together;
    a second clutch that is disposed to connect the first carrier with the second ring gear such that they rotate together;
    a second brake that is disposed to selectively stop a rotation of the second ring gear; and
    one or more controllers configured to release the first/second brakes and the first/second clutches, determine whether the first brake is to be operated or the second clutch is to be operated so as to prepare the transmission to be shifted into drive or reverse, and control the engine, the first motor, and the second motor such that the second ring gear is not rotated when the first brake is to be operated, wherein a speed of the first motor is controlled by calculating a target speed of the first motor, wherein a first calculation is used by the controller to calculate the target speed of the motor when a transmission output shaft speed is greater than a predetermined value and a second calculation is used by the controller to calculate the target speed of the motor when a transmission output shaft speed is less than a predetermined value.

11. The system of claim 10, wherein the one or more controllers are further configured to control the engine, the first motor, and the second motor such that an output speed of the engine is equal to a rotation speed of the second ring gear, if it is determined that the second clutch is to be operated.

* * * * *